United States Patent [19]

Richmond

[11] Patent Number: 5,082,240
[45] Date of Patent: Jan. 21, 1992

[54] QUIET WATER VALVE

[75] Inventor: James W. Richmond, Indianapolis, Ind.

[73] Assignee: Emerson Electric Co., St. Louis, Mo.

[21] Appl. No.: 626,633

[22] Filed: Dec. 12, 1990

[51] Int. Cl.$^5$ .................. F16K 47/08; F16K 47/02
[52] U.S. Cl. .................. 251/120; 251/30.03; 138/45
[58] Field of Search .............. 251/120, 118, 30.03; 138/45

[56] References Cited

U.S. PATENT DOCUMENTS 2,489,542  11/1949  Rosenblum .................. 251/120 X

*Primary Examiner*—Arnold Rosenthal
*Attorney, Agent, or Firm*—Robert F. Meyer

[57] ABSTRACT

A valve includes a rigid washer seated in the valve inlet conduit and supporting a flexible flow control washer having an flow control orifice that constricts with increasing pressure. The washer aperture is axially aligned with the flow control orifice. A cylindrical expansion chamber axially aligned with the orifice and aperture is located immediately downstream of the washer aperture. The expansion chamber has four cylindrical exit ports parallel to the chamber axis and communicating with the valve's valving chamber. Each port has a raised lip about the periphery of the port and extending into the expansion chamber. A bullet is integrally formed with the valve body along the axis of the expansion chamber and extends into the downstream portion of the flow control orifice at all pressures. The bullet has a flared base that directs the water radially into the expansion chamber. The bullet is shaped to provide a substantially uniform passageway through the downstream portion of the flow control orifice at elevated water pressures.

4 Claims, 5 Drawing Sheets

1

QUIET WATER VALVE

BACKGROUND OF THE INVENTION

1. Field of the Invention

The invention in general relates to water valves, and in particular to such valves that are electrically actuated and are used in appliances such as dishwashers.

2. Description of the Prior Art

Electrically operated water valves have been used for generations in appliances such as dishwashers, washing machines and refrigerator icemakers. Such valves generally have a magnetically responsive armature that alternately turns the water supply on and off as determined by the appliance programming. Such valves also generally include a flow control device which provides a constant water flow rate for all water supply pressures that can be reasonably anticipated. Such flow control devices generally comprise a flexible flow control washer supported by a rigid support. The flow control washer includes a flow control orifice communicating with an aperture in the support. The flow control washer is shaped so that water pressure forcing it against the support causes the flow control orifice to become smaller the higher the water pressure. See for example U.S. Pat. No. 4,651,971 issued to William R. Donahue, Jr., and U.S. Pat. No. 4,815,497 issued to James M. Pick. Also see FIGS. 2A and 2B herein, which show the structure of the flow control portion of the valve of U.S. Pat. No. 4,651,971 in greater detail than shown in the patent. FIG. 2A shows the shape of the flow control washer 46' at low pressures, while FIG. 2B shows the shape at high pressures. Such flow control devices tend to cause the valves to be noisy. Noisy valves are undesirable, especially when used in appliances such as dishwashers and icemakers which often operate during the night. Previous valves have included a bullet 52' which guides the water as it leaves the aperture in the flow control support. See U.S. Pat. No. 4,651,971 and FIGS. 2A and 2B herein. Other valves have included an expansion chamber immediately downstream of the aperture. See U.S. Pat. No. 4,815,497. Both the above valves can be quite noisy at certain pressures and quiet at other water pressures. Both valves may also be noisy if the water is gassy. It would be very desirable to have a valve that is quiet at all water pressures that such valves may reasonably be expected to be exposed to, and even in the presence of gassy water supplies, such as in hot water lines.

SUMMARY OF THE INVENTION

It is an object of the invention to provide a water valve that overcomes one or more of the disadvantages of prior art water valves.

It is a further object to provide the above object in a water valve that is quiet at all normal water pressures and when used with cold or hot water.

It is still a further object of the invention to provide one or more of the above objects in a water valve in which the water is decelerated as soon as it leaves the flow control orifice and before it enters the valving chamber.

It is another object of the invention to provide a water valve in which all high velocity components of the water flow are decelerated in an expansion chamber before entering the valving chamber.

It is yet another object of the invention to provide a water valve that provides one or more of the above objects and which prevents outgassing in the flow control orifice.

It is still another object of the invention to provide one or more of the above objects in a water valve that prevents outgassing at the exit of the flow control device.

The invention provides a water valve comprising a housing having an inlet, a valving chamber, an outlet, and a sealing means located between the inlet and the outlet for alternatively permitting water to flow from the valving chamber to the outlet and stopping water from flowing from the valving chamber to the outlet. The water valve further comprises: a water conduit formed in the housing; flow control means located in the conduit between the inlet and the outlet for providing a substantially constant rate of water flow, the flow control means including flexible means for providing a flow control orifice that changes in size depending on water pressure and inflexible means for supporting the flexible means, the inflexible means having an aperture communicating with the flow control orifice; an expansion chamber located immediately downstream of the aperture; a water exit port formed in the expansion chamber; and a raised lip formed about the periphery of the port and extending into the expansion chamber. Preferably, the water valve further comprises a noise suppression bullet extending through the aperture and into the flow control orifice at all water pressures. Preferably, the bullet is formed to provide a substantially uniform passageway through the downstream portion of the flow control orifice at elevated water pressure levels. Preferably, the bullet is further shaped to direct the water flow radially outward into the expansion chamber.

In another aspect the invention provides a water valve comprising a housing having an inlet, a valving chamber, an outlet, and a sealing means located between the inlet and the outlet for alternatively permitting water to flow from the valving chamber to the outlet and stopping water from flowing from the valving chamber to the outlet, the water valve further comprising: a water conduit formed in the housing; flow control means located in the conduit between the inlet and the outlet for providing a substantially constant rate of water flow, the flow control means including flexible means for providing a flow control orifice that changes in size depending on water pressure and inflexible means for supporting the flexible means, the inflexible means having an aperture communicating with the flow control orifice; an expansion chamber located immediately downstream of the aperture; a noise suppression bullet extending through the aperture and into the flow control orifice at all water pressures. Preferably, the bullet is formed to provide a substantially uniform passageway through the downstream portion of the flow control orifice at elevated water pressure levels and is shaped to direct the water flow radially outward into the expansion chamber.

In a further aspect the invention provides a water valve comprising a housing having an inlet, a valving chamber, an outlet, and a sealing means located between the inlet and the outlet for alternatively permitting water to flow from the valving chamber to the outlet and stopping water from flowing from the valving chamber to the outlet. The water valve further comprises: a water conduit formed in the housing; flow control means located in the conduit between the inlet and the outlet for providing a substantially constant rate of water flow, the flow control means including flexible means for providing a flow control orifice that changes in size depending on water pressure and inflexible means for supporting the flexible means, the inflexible means having an aperture communicating with the flow control orifice; and uniform passageway means for providing a substantially uniform passageway through the downstream portion of the flow control orifice at elevated water pressure levels. Preferably, the uniform passageway means includes a noise suppression bullet extending into the flow control orifice.

The invention not only provides a water valve that is far quieter than any appliance water valve known, but also does this without adding parts and without increasing the cost of making the water valve. Numerous other features, objects and advantages of the invention will become apparent from the following description when read in conjunction with the accompanying drawings.

BRIEF DESCRIPTION OF THE DRAWINGS

In the drawings:

FIG. 2A is a partial cross-sectional view of a prior art water valve showing the flow control washer, its support, and the flow control bullet at low water pressures, while

FIG. 3A is a partial cross-sectional view of the valve of FIG. 1 showing the flow control washer, its support, and the bullet at low water pressures, while

DESCRIPTION OF THE PREFERRED EMBODIMENT

Figure 1:
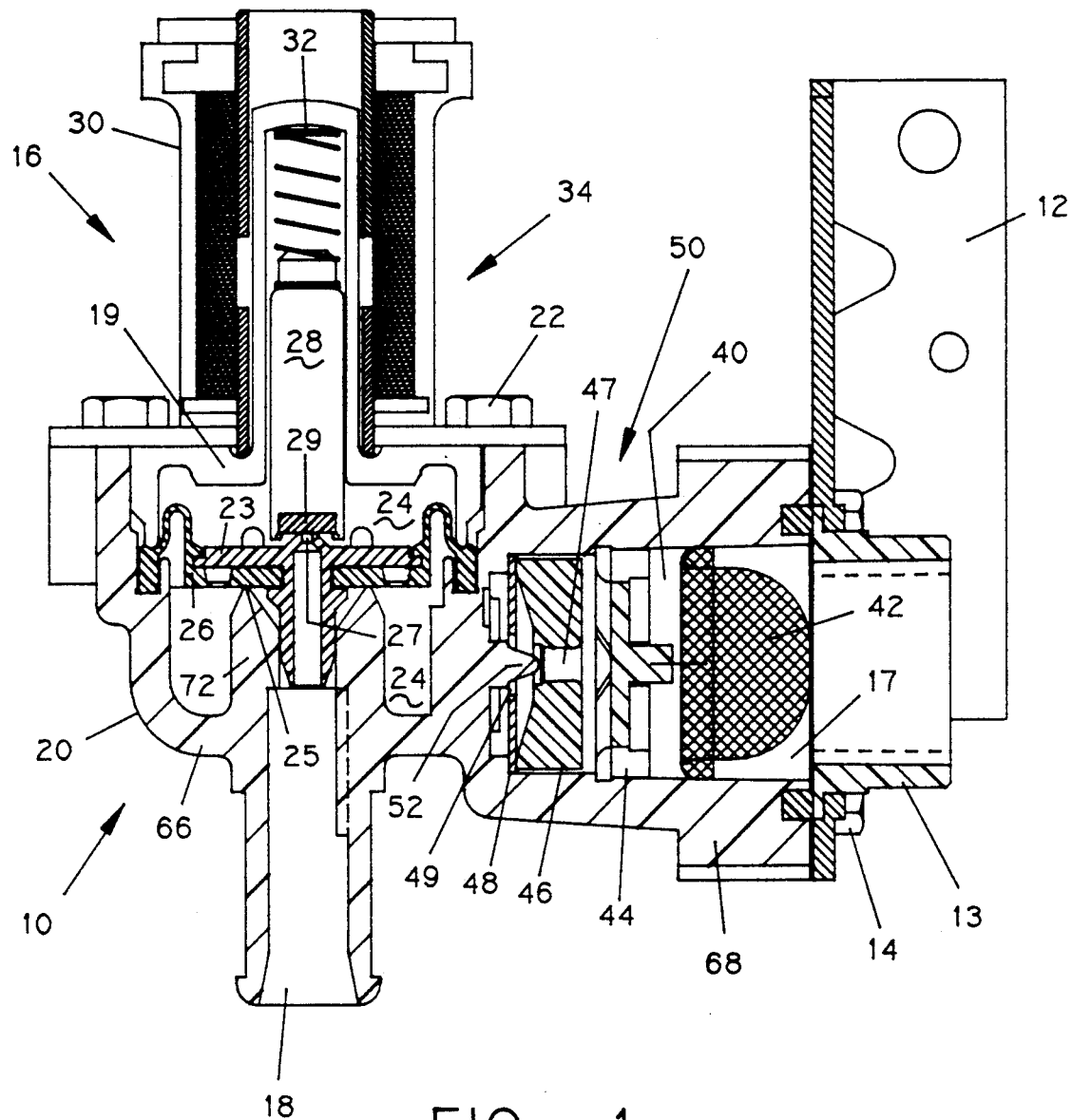
FIG. 1 is a cross-sectional view of a water valve according to the invention and its associated mounting bracket.

A preferred embodiment of a water valve 10 according to the invention is shown in cross section in FIG. 1. The valve is shown attached to a mounting bracket 12 and inlet fitting 13 via screws such as 14. The mounting bracket 12 facilitates the attachment of the valve 10 to an appliance, while the inlet fitting facilitates the attachment of a standard water line (not shown). It should be understood that the embodiment shown and discussed below is only one of many possible embodiments of the invention, and is presented by way of illustration only, and is not intended to limit the invention. The water valve 10 includes a valve housing 16 having an inlet 17 and an outlet 18. The valve housing 16 includes a guide tube 19 and a valve body 20. The guide tube 19 and the valve body 20 are fastened together with screws, such as 22, to form a valving chamber 24 between them. A valve diaphragm having a sealing seat 27 is held between the guide tube 19 and valve body 20 within the valve chamber 24, and an armature 28 having a sealing member 29 is slidable within the guide tube 19. The diaphragm 26, armature 28 together with coil-solenoid 30 and spring 32 together comprise a sealing means 34 located between the inlet 17 and the outlet 18 for alternatively permitting water to flow from the valving chamber 24 to the outlet 18 and stopping water from flowing from the valving chamber 24 to the outlet 18. That is, when current is passed through solenoid 30, the armature 28 rises in guide tube 19 and permits water to pass through the valve seat 27 to the outlet 18, which lowers the pressure in the upper portion of the valving chamber, allowing diaphragm 26 to rise and water to flow past the main valve seat 25 to the outlet 18. When the current is shut off, the armature is pressed downward by spring 32 so that sealing elements 23 and 29 press against valve seats 27 and 25 respectively to stop the flow of water. The sealing means 34 just described is not directly related to the present invention and will not be discussed further herein.

Figure 3A:
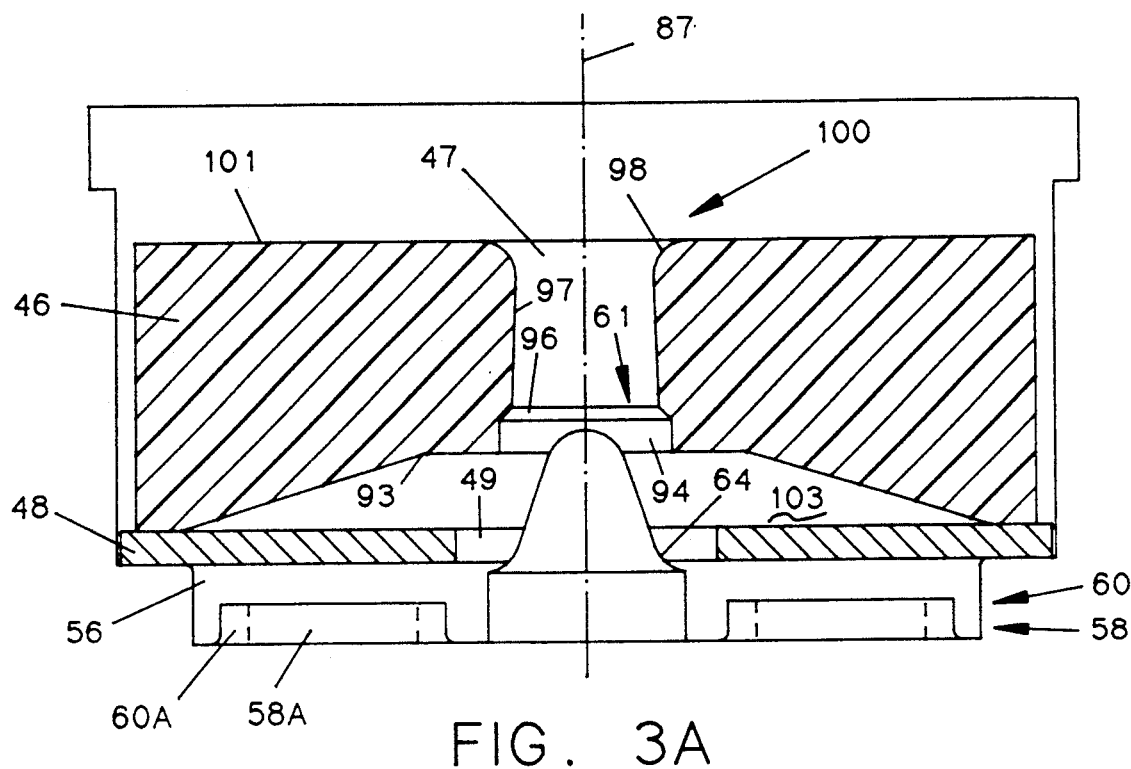

The valve body 20 also includes a conduit 40 which in the embodiment shown extends from the inlet 17 to the valving chamber 24. Within the conduit 40 are an inlet screen 42, a retainer 44, flexible means 46 for providing a flow control orifice that changes in size depending on water pressure, and inflexible means 48 for supporting the flexible means 46. Hereinafter we shall refer to the flexible means as flow control washer 46 and the inflexible means as inlet washer 48. The flow control washer 46 and the inlet washer 48 together comprises a means 50 for providing a substantially constant rate of water flow. The flow control washer 46 has a flow control orifice 47, and the inlet washer 48 has an aperture 49. A bullet 52, which is integrally formed with the valve body 20, extends through the aperture 49 into the orifice 47. The bullet 52 directs water exiting from the flow control means 50 smoothly into an expansion chamber 56 (FIG. 3A). In the preferred embodiment there are four exit ports, such as 58A, from the expansion chamber to the valving chamber 24. A raised lip, such as 60A, is formed about each of the exit ports, such as 58A. The bullet 52, the orifice 47, and aperture 49 are shaped so as the passageway 104 formed between the downstream portion 61 of the orifice 47, aperture 49 and bullet 52 is substantially uniform, which prevents turbulence and outgassing at this critical area. The bullet 52 is flared at its base 64 to direct water outward into the expansion chamber 56. The combination of the expansion chamber, the flared base 64 of the bullet 52, and the raised lips 60 about the ports 58 cause all the water to decelerate before passing into the valving chamber 24, creating an unusually quiet valve.

Figure 3B:
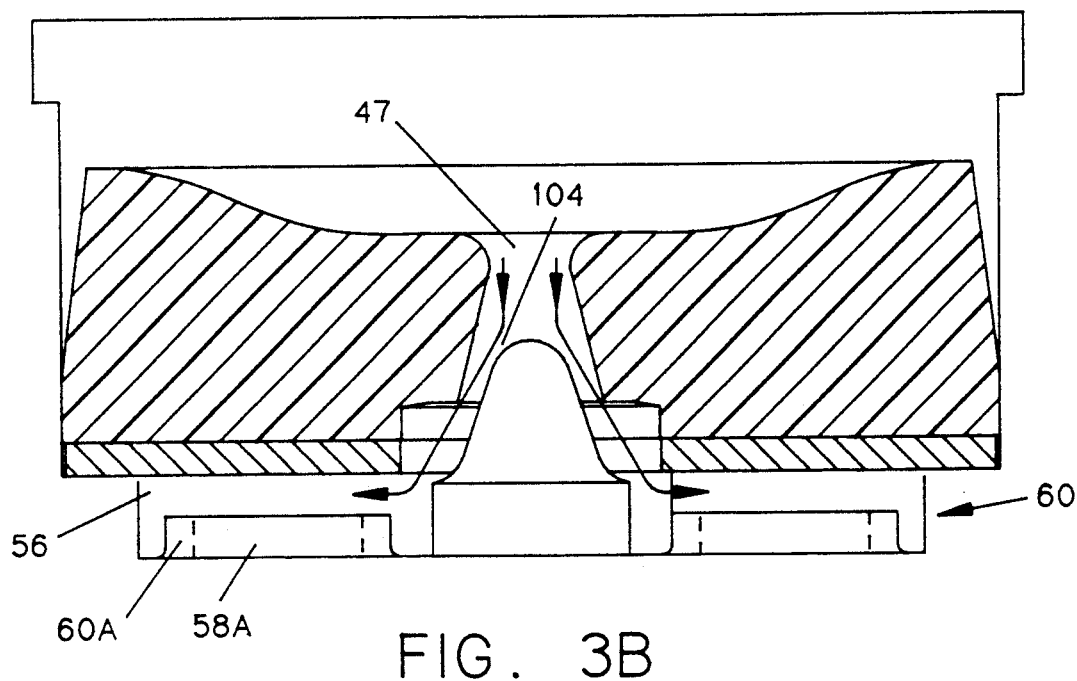
FIG. 3B is the same view at high water pressures.
Figure 4:
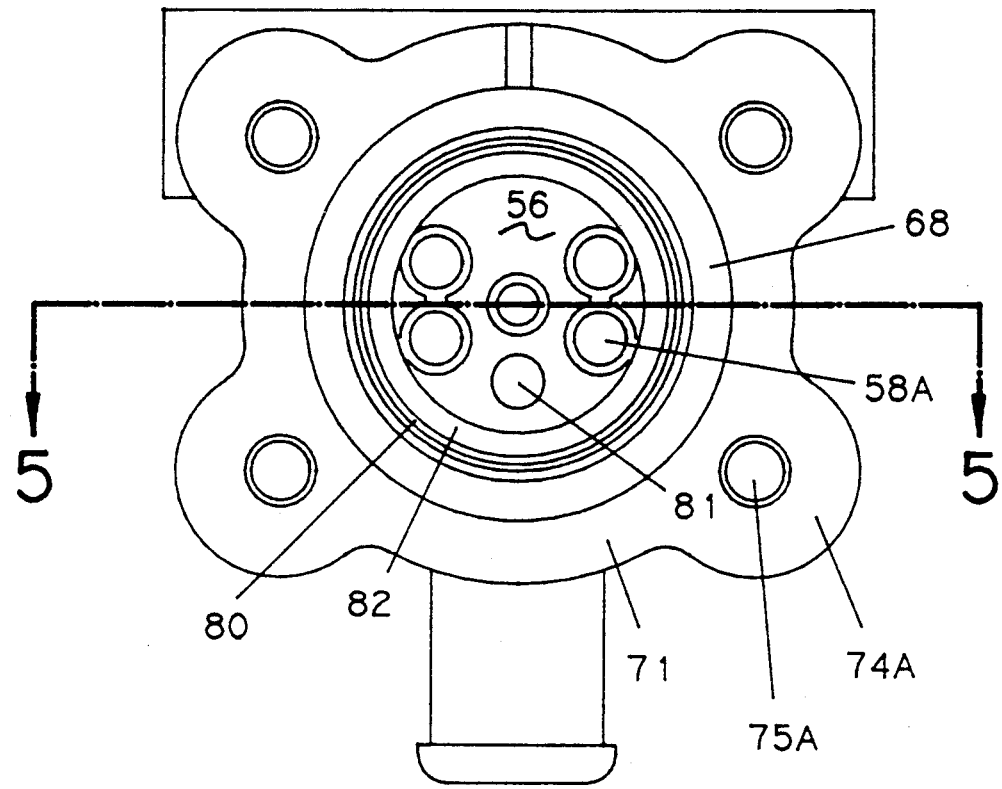
FIG. 4 is a plan view of the valve housing of the valve of FIG. 1 looking into the valve inlet.
Figure 5:
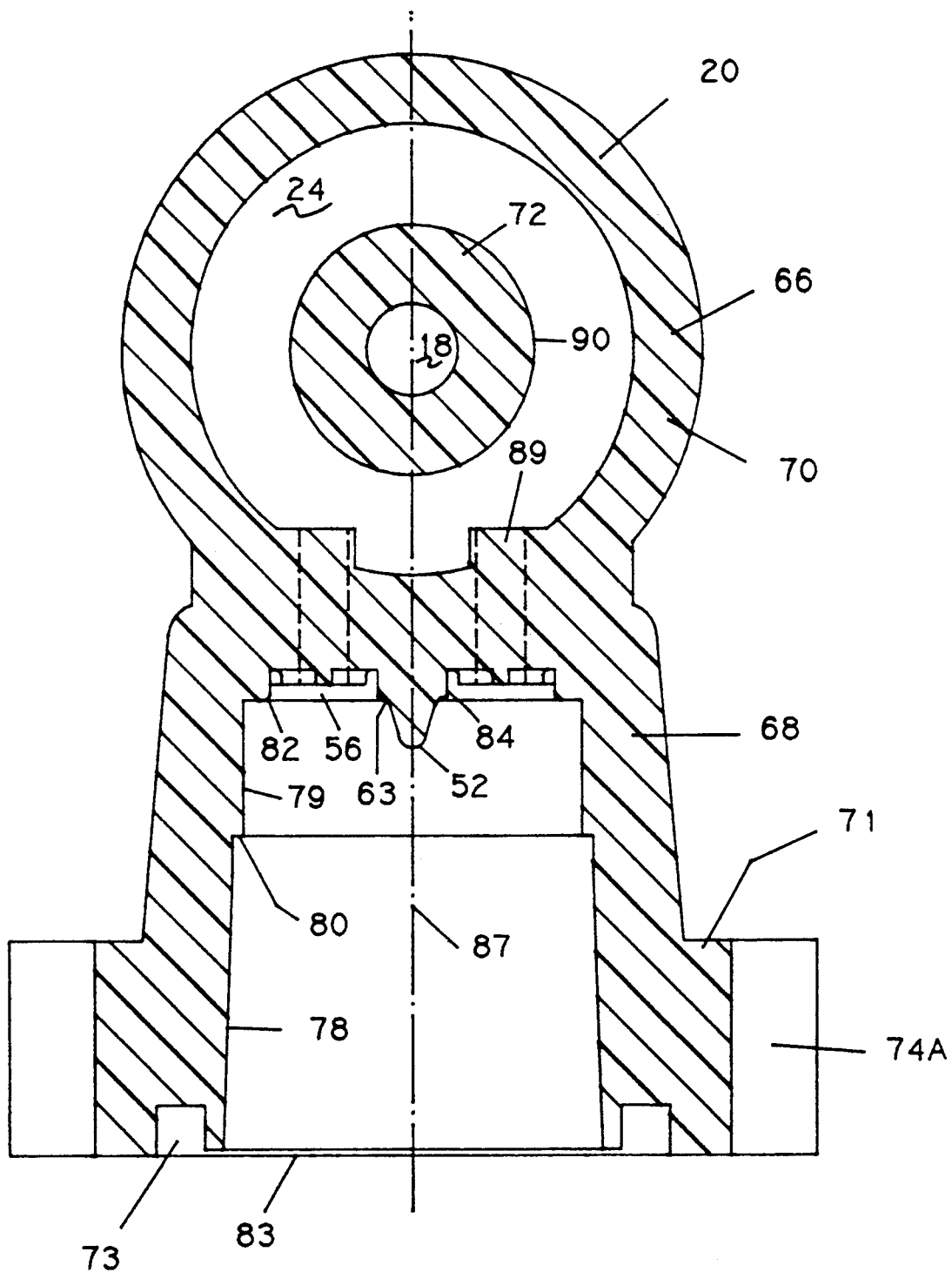
FIG. 5 is a cross-sectional view taken through line 5—5 of FIG. 4.

Turning now to FIGS. 3A, 3B, 4, and 5, the water valve 10 according to the invention will now be described in detail. Valve body 20 comprises a first cup-shaped portion 66 and a second cup-shaped portion 68 which are integrally formed at right angles to one another. This general structure is perhaps best seen in FIG. 5. The portion 66 includes a outer cup 70 generally forming the outer wall of the valving chamber 24, and an inner cylindrical throat 72 generally forming the inner wall of the valving chamber 24 and the outer wall of the outlet passage 18. The portion 68 includes a flange 71 having a groove 73 (FIG. 5) for receiving an elastomer seal (not shown), four semi-circular lobs, such as 74A, each lob having a self-threading bore, such as 75A (FIG. 4). The inner structure of cup-shaped portion 68 includes an outer bore 78, an intermediate bore 79, and an inner bore which forms expansion chamber 56. The juncture of bores 78 and 79 forms rim 80, while the juncture of bore 79 and expansion chamber 56 forms rim 82. Outer bore 78 is roughly cylindrical, however its wall tapers outward slightly from a diameter of 0.750 inches where it joins rim 80 to a diameter of 0.765 inches at the outer end 83. It has a depth of 0.935 inches. Intermediate bore 79 is a cylinder of 0.710 inches diameter and a depth of 0.290 inches. Expansion chamber 56 is washer shaped having an outer diameter of 0.600 inches and an inner diameter of 0.148 inches, and a depth of 0.065 inches. Each of the four exit ports 58 is a cylindrical bore of 0.125 inches in diameter, while the outside diameter of each of lips 60 is 0.170 inches. Each of lips 60 is 0.033 inches high. The center lines of each of cylindrical ports 58 is 0.195 inches from the central axis 87 in the plane of FIG. 5 and 0.100 inches from the axis 87 in the plane of FIG. 1. A coring 81 (FIG. 4) may optionally be provided to reduce the total mass of the valve and provide more dead space in the expansion chamber 56. Bullet 52 is formed at the center of the bottom of cup 68 on a cylindrical pedestal 84 which is 0.148 inches in diameter and 0.057 inches high, or 0.008 inches below rim 82. Bullet 52 extends 0.100 inches beyond rim 82, is rounded at its tip in a radius of 0.028 inches, and its cone-shaped sides slope at an angle of 17 degrees with its central axis 87. A flare 63 joins the base of bullet 62 and pedestal 84 and is rounded in a reverse radius of 0.034 inches. If the outer edges, such as 89, of the ports are extended toward throat 72, they will pass the outer circumference 90 of throat 72 with a slight clearance of about 0.005 inches.

Turning now to FIGS. 1, 3A, and 3B, inlet washer 48 is symmetrical about axis 87. It has an outer diameter of 0.700 inches, an inner diameter (the diameter of aperture 49) of 0.187 inches, and is 0.025 inches thick. Flow control washer 46 nominally has an outer diameter of 0.68 inches and is 0.22 inches thick at its outer periphery. Orifice 47 is nominally 0.110 inches in diameter in portion 97. The specific dimensions of the flow control washer 46 including portions 94 and 96 of orifice 47 and the curvature of flare 98 are generally determined by the specific application and are generally well-known in the art and thus will not be discussed herein.

Valve body 20 is preferably integrally molded of any suitable plastic or metal, preferably polypropylene. Inlet washer 28 is made of any suitable inflexible metal or plastic, preferably stainless steel. Flow control washer 46 is made of any suitable flexible rubber or plastic, such as Buna rubber or ethylene propylene.

The valve 10 according to the invention is assembled by inserting washer 48 into bore 79 of cup-shaped portion 68 until it seats on rim 82. Flow control washer 46 is then inserted into the same bore until it seats on washer 48. Insert 44 is then inserted into bore 78 until it seats on rim 80. The rest of the valve is assembled in a conventional manner or as described in prior patents.

The parts of the water valve 10 not described in detail above are conventional or are described in prior patents.

The valve according to the invention operates as follows. When water is introduced into conduit 40, the narrow constriction of orifice 47 as compared to the rest of the conduit creates a pressure drop across the flow control washer 46. The higher pressure on the upstream side 101 tends to compress the washer 46 against inlet washer 48. The design of flow control washer 46 causes the upstream end 100 of orifice 47 to constrict inward. The greater the water pressure at the inlet, the greater the pressure difference across the flow control washer 46, and the greater the constriction of the upstream end 100 of the orifice 47. FIG. 3A shows the shape of the flow control washer 46 at low pressures, FIG. 3B shows the shape at high pressures. The constriction of end 100 of orifice 47 at higher pressures causes the net flow of water through the orifice to be approximately constant for any pressure within a range of from about 20 psi to about 120 psi.

The invention functions to direct water flow radially outward into expansion chamber 56 as shown by the arrows in FIG. 3B. This radial flow into expansion chamber 56 occurs both at low and high pressures. The larger diameter of expansion chamber 56 compared to orifice 47 causes the water to decelerate. Exit ports 58 leave the expansion chamber in a direction perpendicular to the radial flow. Lips, such as 60A, about the exit ports, such as 58A, prevent the water form escaping from the expansion chamber 56 before it decelerates.

Bullet 52 directs the water smoothly out of orifice 47. As seen in FIG. 3A bullet 52 extends into the downstream end 61 of orifice 47 even at low pressures. The correspondence of the angle of the sides of the bullet 52 and the average angle of the sides of the downstream end 61 of orifice becomes greater the higher the pressure. In practice the water pressure tends to smooth the angles of walls of portions 96 and 94 of the orifice more than is shown in the drawings, since these walls are flexible. This correspondence between the angle of the bullet 52 and the angle of the walls of the downstream end 61 of orifice 47 causes the passageway 104 (FIG. 3B) between the walls of orifice 47 and the bullet 52 to be more uniform than in prior art valves. At elevated pressures most irregularities smooth out and the passageway becomes substantially uniform. By substantially uniform is meant that the passageway is sufficiently uniform to prevent outgassing in the passageway. It has been found that the extension of the bullet so that it extends into the orifice 47 even at low pressures significantly quiets the water flow at both low and high pressures.

Figure 2A:
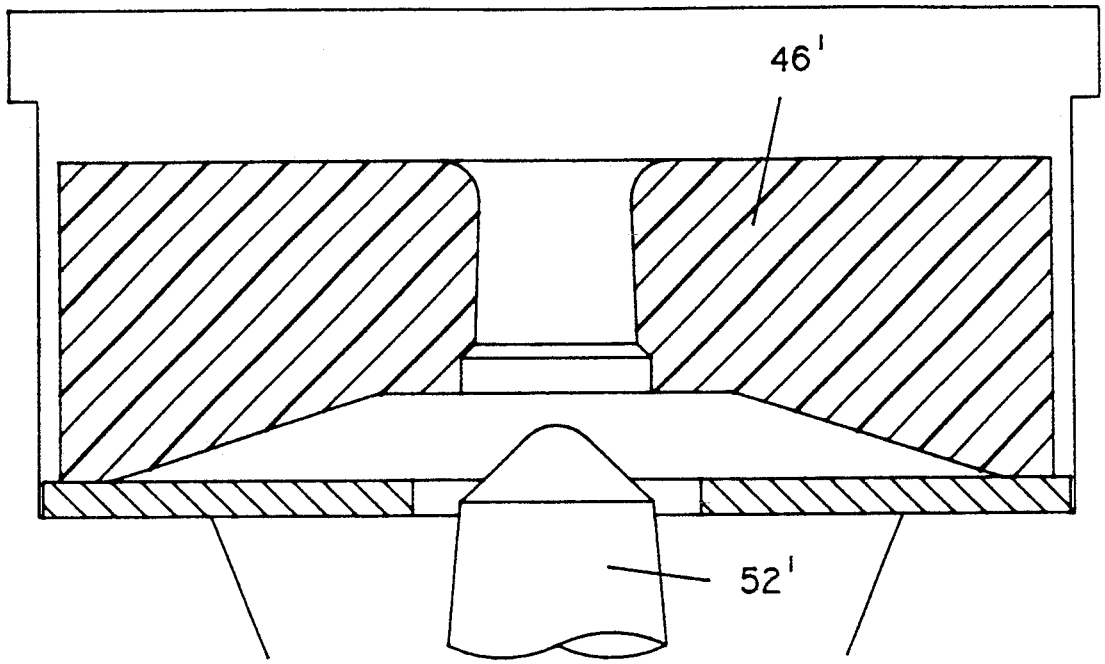
Figure 2B:
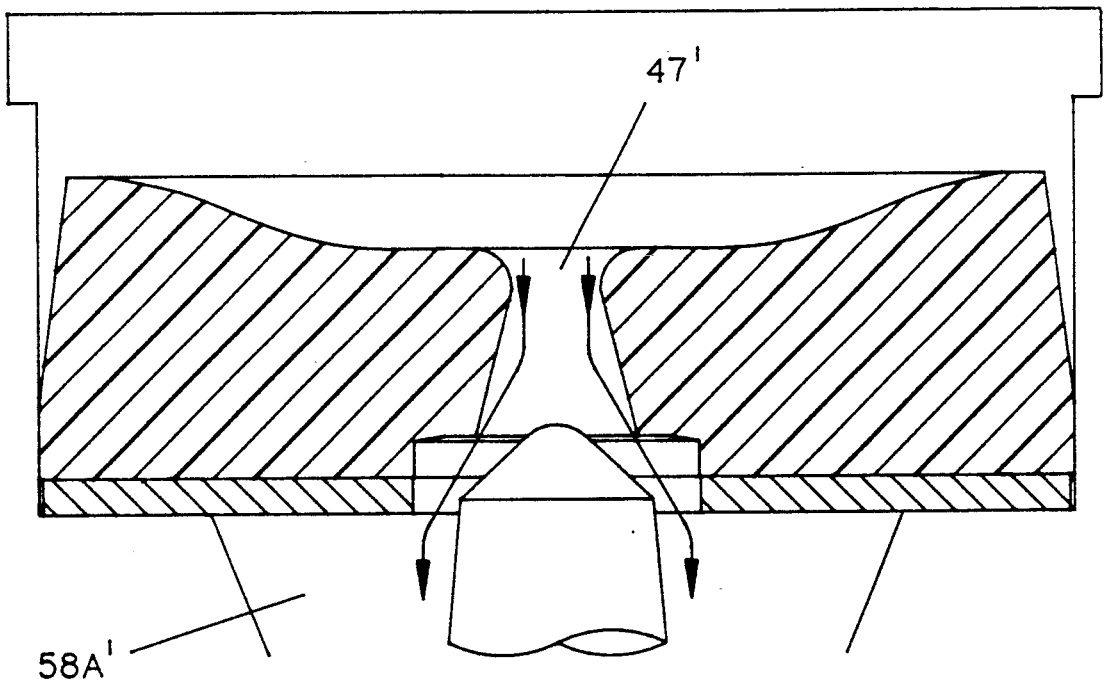
FIG. 2B is the same view at high water pressures.

The velocity of the water is greatly accelerated as it passes through orifice 47. It is a feature of the invention that none of the high velocity components can pass through ports 58 to valving chamber 24. This compares sharply with the prior art valves, in which, as shown by the arrows in FIG. 2B, high velocity components can flow directly from orifice 47 through exit port 58A' into the valving chamber without decelerating. Further, in the present invention, the placement of the ports 58 with respect to throat 72 further smooths the entry of the water into valving chamber 24, causing the water to be more uniformly distributed throughout the chamber, further reducing water noise.

It is another feature of the invention that valves that are much less noisy at all pressures are provided with minimum changes of the prior art valves. The same piece parts, such as flow control washer 46, inlet washer 48, insert 44, and screen 42 can be used with the valve of the invention as were used in the prior art valves. Moreover, the valving chamber 24, sealing means 34, and related parts are not changed at all. This allows a new, much quieter valve to be produced inexpensively.

There has been described a novel water valve that provides much quieter valves over a wide range of water pressures, with only minimum changes to the valve structure. It is evident that those skilled in the art may now make numerous uses and modifications of the specific embodiment described, without departing from the inventive concepts. For example, the valves may be made with a wide variety of dimensions and materials. A greater or lesser number of ports 58 may be used. Consequently, the invention is to be construed as embracing each and every novel feature and novel combination of features present in and/or possessed by the water valve described.

What is claimed is:

1. A water valve comprising a housing having an inlet, a valving chamber, an outlet, and a sealing means located between said inlet and said outlet for alternatively permitting water to flow from said valving chamber to said outlet and stopping water from flowing from said valving chamber to said outlet, said water valve further comprising:

a water conduit formed in said housing:

flow control means located in said conduit between said inlet and said outlet for providing a substantially constant rate of water flow, said flow control means including flexible means for providing a flow control orifice that changes in size depending on water pressure and inflexible means for supporting said flexible means, said inflexible means having a aperture communicating with said orifice;

an expansion chamber located immediately downstream of said aperture;

a water exit port formed in said expansion chamber;

a raised lip formed about the periphery of said port and extending into said expansion chamber; and a noise suppression bullet extending through said aperture and into said flow control orifice at all water pressures.

2. A water valve as in claim 1 wherein said bullet is formed to provide a substantially uniform passageway through the downstream portion of said flow control orifice at elevated water pressure levels.

3. A water valve as in claim 2 wherein said bullet is further shaped to direct the water flow radially outward into said expansion chamber.

4. A water valve as in claim 1 wherein there are 4 of said exit ports and four of said raised lips.

* * * * *